Nov. 21, 1933.  T. H. KENNEDY  1,936,362
REGULATING DEVICE
Filed Oct. 17, 1928   2 Sheets-Sheet 1

INVENTOR
Theodore H. Kennedy
BY
ATTORNEYS

Nov. 21, 1933.   T. H. KENNEDY   1,936,362
REGULATING DEVICE
Filed Oct. 17, 1928   2 Sheets-Sheet 2
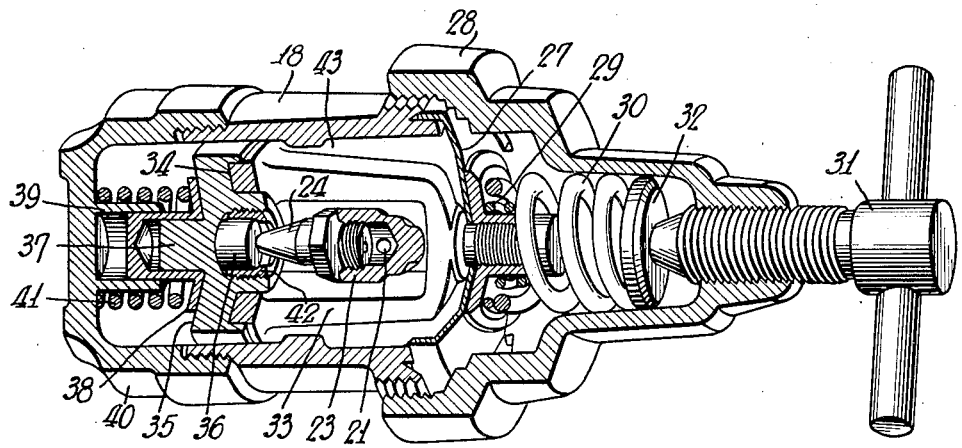
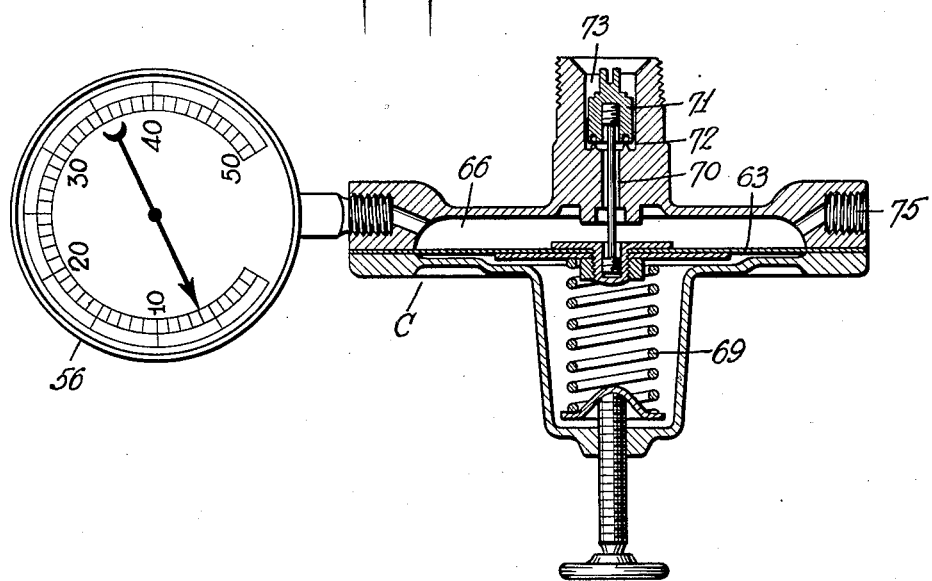
INVENTOR
Theodore H. Kennedy
BY
Dean Fairbank Hirsch & Foster
ATTORNEYS Patented Nov. 21, 1933

1,936,362

UNITED STATES PATENT OFFICE 1,936,362

REGULATING DEVICE

Theodore H. Kennedy, South Bend, Ind.

Application October 17, 1928. Serial No. 313,033

2 Claims. (Cl. 158—27.4)

This invention relates to regulating devices for controlling the pressure of the gas used in oxyacetylene heating and welding devices, the principal object being to provide new, improved and simple means for regulating the acetylene and oxygen flow in a welding torch in order to maintain a constant flame.

Another object of this invention is to provide a gas welding device with means for maintaining a neutral welding flame, consisting in incorporating line regulators into the acetylene and oxygen regulating units whereby the flow of oxygen and acetylene is constant.

A further object is to provide a gas welding device with means for preventing the pressure of the acetylene and oxygen entering the welding torch from fluctuating.

A still further object is to provide a gas welding device with a two-step regulator to prevent the acetylene and oxygen pressure from fluctuating in order to maintain a constant welding flame.

In carrying out my invention I provide two pressure regulators in series and as the important feature I make the first of these regulators of what is known as the positive type, that is, a regulator in which the high pressure gas acts on the valve tending to open it, and I make the second regulator of what is known as the negative type, that is, a regulator in which the gas at the inlet side of the valve acts on the latter tending to close it. By this combination of the two types of regulators I am able to secure far more satisfactory results than are obtained by using two regulators of the same type.

These being among the objects of the present invention the same consists of certain features of construction and combinations of parts to be hereinafter described with reference to the accompanying drawings, and then claimed, having the above and other objects in view.

In the accompanying drawings which illustrate a suitable embodiment of the present invention, Figure 1 is a front elevation of a complete welding device, showing the oxygen and acetylene tanks, regulating means therefor, and the welding torch.

Fig. 3 is a partial perspective and partial sectional view of the positive type, first stage regulator, and Fig. 4 is a longitudinal section of the negative type, second stage regulator.

Figure 1:
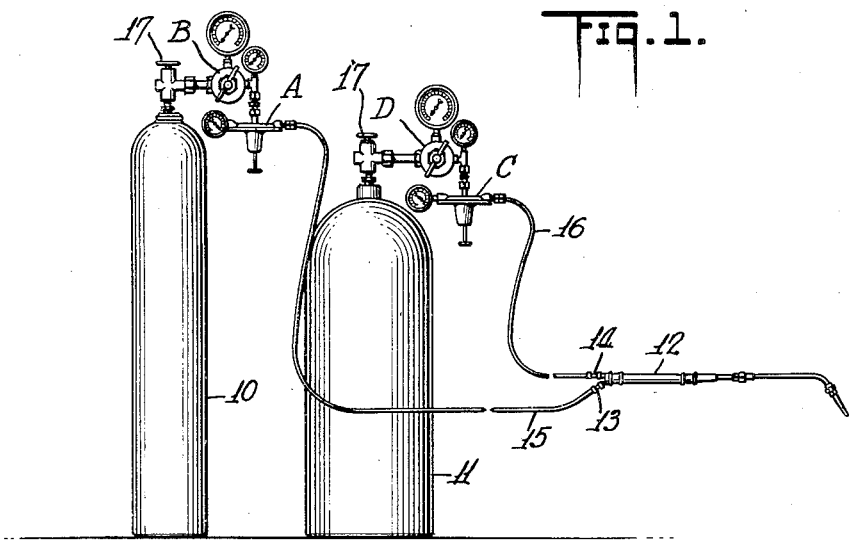
Figure 2:
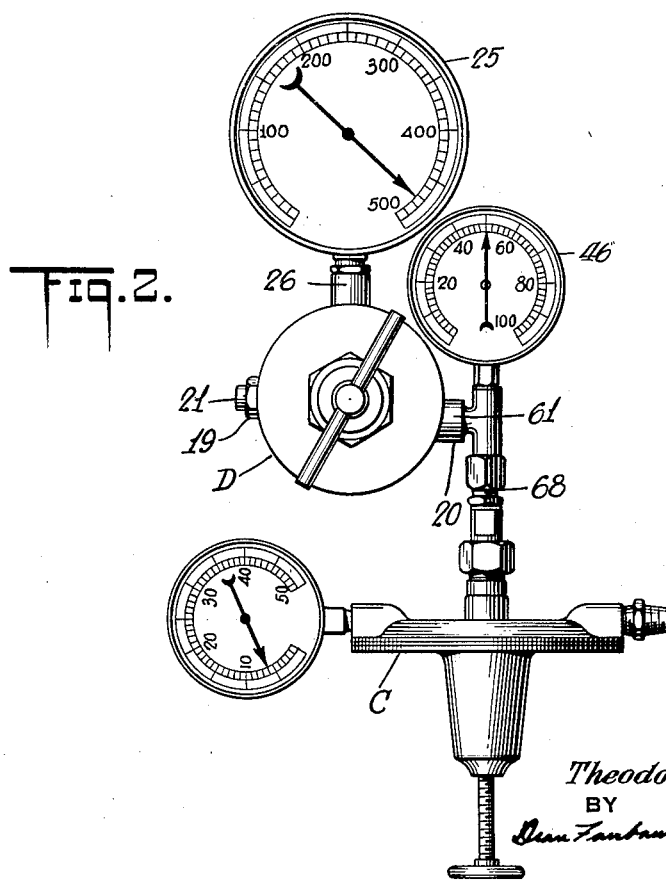
Figure 2 is an enlarged elevation of one of the regulating devices.

The use of a single regulator has not proven satisfactory because of the impossibility of maintaining a neutral flame. This condition is caused by what gas welding operators call "creeping". "Creeping" is the result of an uneven flow of oxygen or acetylene. The single type regulators just mentioned may be one hundred percent efficient when they are new, but after they have been used for a while and are worn in, dirt clogs the valves and due to the high pressures, pits the seats of the same. "Creeping" of either the acetylene or oxygen then begins and the operator can not maintain a constant correct flame with the result that he cannot do suitable welding. The correct flame is one wherein the mixture of the two gases is well balanced so that it has a luminous well defined shape and not a ragged contour. It can be readily understood that it is very essential to maintain constant pressures of both the acetylene and oxygen in the welding torch. The pressure in the oxygen tank may run as high as 3000 pounds per square inch and that in the acetylene tank may run as high as 500 pounds per square inch. It is apparent that with a pressure of 3000 pounds per square inch that any dirt particle which may be in the tank will be driven against the regulating valve seat with a tremendous force which causes the same to pit and allow the pressure to "creep".

Referring to the accompanying drawings in which like numerals refer to like parts throughout the several views, this invention comprises in general, a line regulator A and a tank regulator B for the oxygen supply tank 10, and line and tank regulators C and D respectively, for the acetylene supply tank 11. The pressures are first reduced their greatest amounts by the tank regulators B and D and then are reduced a second time by the line regulators A and C. Dirt particles will therefore not strike the valve seats of the regulators A and C with any great force and will not pit the same with the result that constant line pressures will be maintained. The welding torch 12 is provided with two inlets 13 and 14, the inlet 13 being connected by a hose 15 to the outlet side of the line regulator A, and the inlet 14 being connected by a hose 16 to the outlet side of the line regulator C.

Because of the fact that the pressure regulating devices for both tanks 10 and 11 are identical with the exception that they operate at different pressures, only the regulating device for the acetylene tank 11 will be described in detail.

This device is best shown in Figures 3 and 4, and in the following description, these views will be referred to. The acetylene regulating device as previously described comprises the two regulators C and D. The inlet side of the tank regulator D is connected by a suitable shut off valve 17 to the tank 11 and the outlet side of the regulator C is connected to the conducting hose 16.

The tank regulator D comprises a hollow cylindrical casing 18 having extensions 19 and 20 at opposite sides thereof provided with inlet and outlet passageways respectively, the passageway in the extension 19 being shown at 21 in Figure 3. A portion 23 of the metal forming the casing 18 extends transversely within the same substantially midway between its ends and the inlet passageway 21 is extended into the portion 23 and makes a right angled turn therein, the center line of which is coincident with the axis of the casing 18. The discharge nozzle 24 is threaded into the axial portion of the passageway 21 as shown in Figure 3. A pressure indicator 25 is suitably attached to the extension 19 and has a passageway 26 leading to the passageway 21. The acetylene enters the passageway 21 from the tank 11 and discharges through the nozzle 24 and also passes into the passageway 26 and is conducted to the indicator 25 so that the entering pressure, that is, the tank pressure is indicated thereon. A flexible diaphragm 27 closes one end of the casing 18 and is clamped thereagainst by a bonnet 28 threaded onto the casing 18. The bonnet 28 as shown in Figure 3 contains coil springs 29 and 30, one within the other, which seat against the diaphragm 27. The bonnet 28 has a screw 31 threaded therein which engages a washer 32 seated on the springs 29 and 30, so that the springs 29 and 30 may be compressed by rotating the screw 31. Within the casing 18 and secured to the diaphragm 27 is a U-shaped member 33, the legs of which extend below the bottom of the nozzle 24 on opposite sides of the same and are seated in an annular groove 34 formed in the valve 35. The valve 35 has an axial projection 37 which is enclosed by a cylindrical shell 38 that is axially slidable in a tubular portion 39 formed in the cap 40. The cap 40 is threaded onto the open end of the casing as shown in Figure 3 and contains a coil spring 41 surrounding the tubular portion 39, and seating against the valve 35, or rather, a flange on the shell 38 which engages the valve 35. A seat 36 is supported by the valve 35 and is held in position by a ferrule 42 threaded into the valve 35.

In normal inoperative position the compression in the springs 29 and 30 is released by threading the screw 31 outwardly, and the spring 41 forces the valve 35 and consequently the valve seat 36 against the nozzle 24 to close the axial passageway therein.

The acetylene enters the tank regulator thru the passageway 21 of the extension 19 and if the same is closed, the seat 36 engages the nozzle 24 and does not allow the acetylene to pass therethrough. When however, the regulator is opened by threading the screw 31 inwardly to compress the springs 29 and 30, the diaphragm 27 moves to carry the seat 36 away from the nozzle 24 and allow the acetylene to flow thru the nozzle 24 into the expansion chamber 43 surrounding the same. The incoming pressure of the acetylene exerts itself against the diaphragm 27 until sufficient pressure is created to overcome the pressure of the springs 29 and 30 on the opposite side of the diaphragm 27, thus forcing the seat 36 against the nozzle 24 and shutting off the flow. It will be noted that the high pressure gas in the nozzle constantly acts on the valve and aids the spring in tending to open the valve. This type of regulator is known as the positive type. The outlet of the tank regulator D is controlled by the line regulator C.

The line regulator C is of the negative type. The regulator C is connected by a coupling 61 to the tank regulator D and has an inlet passageway 73 therein connected to the outlet passageway 68 of the regulator D. An indicator 46 is secured to the coupling 61, and is formed with a recess which leads to the passageway of the extension 20 and the passageway 73 so that the pressure of the acetylene leaving the regulator D and entering the regulator C may be indicated thereon. The regulator C has a valve 71 and a valve seat 72. The valve is normally pressed away from the seat by the spring 69, which abuts a diaphragm 63. Acetylene enters the regulator C thru the passageway 73, flows through the passage along the stem 70 by the valve into the expansion chamber 66 and flows into a passageway 75 leading to the hose 16. A separate passage from the same chamber leads to an indicator 56. The indicator 56 shows the pressure of the acetylene passing to the welding torch 12.

In actual practice with the welding device in operating condition, the regulating device is adjusted so that the pressure of the acetylene entering the regulator D will read from 0 to 500 pounds per square inch, dependent upon the quantity in the tank 11.

The device is also adjusted so that the pressure of the acetylene leaving the regulator D thru passageway of the extension 20 will register approximately 50 pounds per square inch on the indicator 46, and so that the pressure of the acetylene leaving the line regulator C will register from 0 to 40 pounds per square inch, dependent on the nozzle and flame required.

A torch nozzle operating under a pressure of 6 pounds per square inch will be cited as an example. The regulator C is adjusted then so that the indicator 56 will register 6 pounds when the torch is being used. Acetylene entering the torch inlet 14 thru the hose 16 is controlled by a shut off valve at the inlet 14, and when this valve is opened, the acetylene flows from the expansion chamber 66 of the line regulator C, decreasing the pressure against the diaphragm 63. This decrease in pressure allows the spring 69 to move the diaphragm 63 to consequently force the valve 71 away from the seat 72 sufficiently to permit the acetylene entering thru the passageway 73 to maintain a balance of pressure against the diaphragm 63, thereby keeping a constant pressure of 6 pounds per square inch in the hose 16. Acetylene entering the expansion chamber 66 of the regulator C likewise causes the pressure in the expansion chamber 43 of the tank regulator D to drop below 50 pounds per square inch, with the result that the springs 29 and 30 move the diaphragm 27 to force the seat 36 away from the nozzle 24 in order to allow more acetylene to enter the expansion chamber 43 from the supply tank 11 to maintain a constant pressure of 50 pounds per square inch therein. It is plainly evident that this device is automatic, once the valves C and D are set so that the indicator 56 will register the pressure desired at the torch nozzle, and the indicator 46 to register the intermediate pressure of 50 pounds per square inch.

Any dirt particles entering the regulator D may impinge against the seat 36 and pit the same due to the force caused by the high tank pressure, but because of the fact that the pressure in the passageway 73 and the passageway in the extension 20 is only substantially 50 pounds per square inch, the dirt particles will not injure the valve seat 72 in the regulator C because of the low pressure. Thus a constant pressure of the acetylene entering the torch 12 will be maintained and the same will not have the objectionable disadvantage of "creeping".

When these double pressure reducing devices are used on both the acetylene and oxygen tanks, it is evident that the pressures of acetylene and oxygen will be constant, with the result that the same will be properly mixed because the correct proportion will be maintained. The mixture therefore, will burn with the desired neutral flame.

One other advantage of this invention is the safety feature. Many explosions and accidents have resulted in the single type regulated welding devices, which were due to the improper functioning of the same. If the single regulator did not function properly, the large pressure of the oxygen or acetylene ruptured the hose and caused accidents. In the present invention, if one of the regulators fails to operate, the other functions as a safety for the same. There are many other advantages which should be readily apparent to any one skilled in the art.

In the regulator D the spring 30 acts to force the valve open, while the inlet and delivery pressures act in opposition to each other, that is, the inlet pressure delivered through the passage 21 and nozzle 24 tends to open the valve, while the delivery pressure in the chamber 43 acts on the diaphragm to close the valve. Assuming the tension of the spring 30 to remain constant, it will be noted that the spring cannot open the valve when the operating effect of the pressure of the delivered gas minus the operating effect of the supply gas exceeds that of the spring. Therefore as the inlet or supply pressure decreases due to the using up of the gas in the supply tank, a lower delivery pressure in the chamber 43 will be sufficient to close the valve against the spring 30. In other words, a decrease in the inlet pressure results in a decrease in the delivery pressure, although obviously due to the difference in the areas of the diaphragm and the passage in the nozzle, a comparatively large drop in the inlet pressure causes only a comparatively small drop or creep in the delivery pressure.

In the regulator C the spring 69 likewise acts to open the valve, but here the closing is effected by the combined actions of the inlet pressure on the valve itself and the outlet or delivery pressure on the diaphragm. The valve in opening moves against the inlet pressure rather than with it as in Fig. 3. Therefore in order to balance the pressure of the spring 69, a decrease in the supply or inlet pressure must be accompanied by an increase in the delivery pressure in the chamber 66.

Furthermore the outlet in the nozzle 24 to the valve 36 of regulator D is very small so that large variations in inlet pressure have the minimum effect, while the outlet from the valve 71 along the stem 70 of the regulator C is very much larger, but the pressure variation in the passage connecting the two regulators and serving to supply the regulator C is small as compared to the pressure variations in the supply tank leading to the regulator D.

By using two regulators in series with the first regulator of the nozzle or positive type and the second regulator of the stem or negative type, the drop in pressure of the gas delivered by the first regulator as the tank pressure decreases is counteracted in part by the tendency of the second regulator to increase its delivery pressure with a drop in the pressure supplied thereto. The net effect is a more nearly constant pressure on the torch during a very wide pressure drop in the tank, and fewer readjustments of the regulator diaphragm springs are required.

It is to be understood that this invention does not relate to the design of the line and tank regulators, but relates to the use of two regulating devices, one of the positive and the other of the negative type, to obtain constant non-creeping gas pressures in the welding nozzle.

Formal changes may be made in the construction described without departing from the spirit and substance of the broad invention, the scope of which is commensurate with the appended claims.

What I claim is:

1. A welding or heating apparatus, including a gas supply tank which delivers its gas at a gradually decreasing pressure, a torch, and means for maintaining the gas pressure at the torch substantially constant during decrease in pressure in said supply tank, including a pair of pressure regulators in series between the tank and the torch, each regulator having a valve, a diaphragm connected thereto, a spring acting on the diaphragm and tending to open the valve, a regulating screw for varying the effective pressure of the spring, and a gas delivery chamber having one wall thereof formed by said diaphragm, one of said valves being movable to open position with the supply pressure from the tank thereto, whereby decrease in high supply pressure causes a drop in delivery pressure to the other valve, and the other of said valves being movable to open position against the supply pressure from the first mentioned valve thereto, whereby decrease in supply pressure causes increase in delivery pressure to the torch, the diaphragm of the first mentioned valve being materially smaller than that of the second mentioned valve, and the variations of said regulators acted on by, and controlling, the gas at different pressures tending to counteract each other and reduce to a minimum the variation in the pressure delivered to the torch during wide variations in the pressure of the gas delivered from said supply tank.

2. A welding or cutting apparatus including a gas supply tank adapted to contain gas under high pressure and adapted to deliver said gas at a gradually decreasing pressure, a torch, and means for maintaining the gas pressure at the torch substantially constant during decrease in pressure in said supply tank, including a pressure regulator having a chamber, a nozzle for delivering gas from said tank into said chamber, a valve member in said chamber for closing said nozzle and movable in the direction of gas flow, to open position, a diaphragm operatively associated with said valve member and forming a wall of said chamber, and a spring acting on said diaphragm to open said valve member upon decrease in pressure in said chamber, and a second pressure regulator for receiving gas from said chamber and delivering it to said torch, and including a gas chamber, a gas passage delivering gas to said chamber from the chamber of the first mentioned regulator, a valve member for controlling said passage and movable against gas flow, to open position, a diaphragm operatively associated with said last mentioned valve member and forming a wall of said last mentioned chamber, a spring acting on said last mentioned diaphragm and tending to open said last mentioned valve member, and a regulating screw for varying the effective pressure of said last mentioned spring, the variations of said regulators acted upon and controlling the gas at decreasing supply pressure tending to counteract each other and reduce to a minimum the variations in the pressure delivered to the torch during wide variations in the pressure of the gas delivered from said supply tank.

THEODORE H. KENNEDY.